Dec. 11, 1923.
J. J. REISIGER
1,477,446
SAFETY ATTACHMENT FOR MOUSE AND RAT TRAPS
Filed March 9, 1923
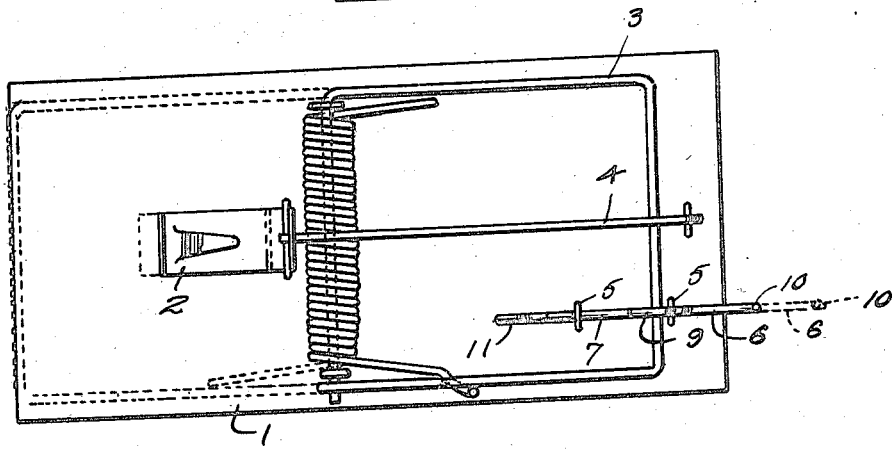
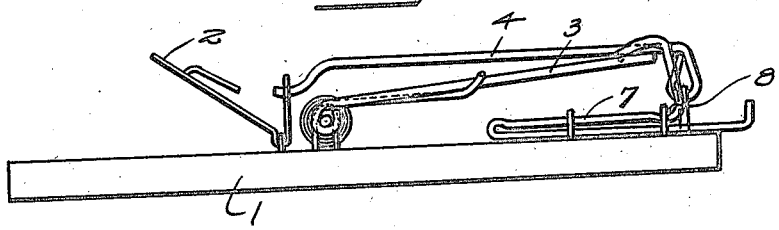
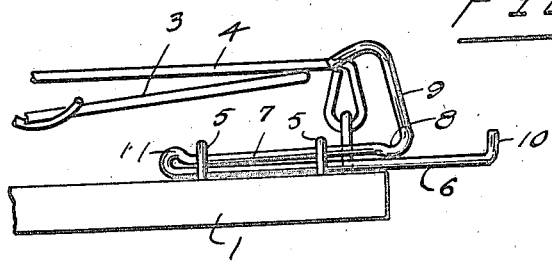
Inventor
J. J. Reisiger.
By
Attorney Patented Dec. 11, 1923.

1,477,446

UNITED STATES PATENT OFFICE.

JOHN J. REISIGER, OF COVINGTON, KENTUCKY.

SAFETY ATTACHMENT FOR MOUSE AND RAT TRAPS.

Application filed March 9, 1923. Serial No. 623,915.

*To all whom it may concern:*

Be it known that I, JOHN J. REISIGER, a citizen of the United States, residing at Covington, in the county of Kenton and State of Kentucky, have invented certain new and useful Improvements in Safety Attachments for Mouse and Rat Traps; and I do hereby declare the following to be a full, clear, and exact description of the invention, such as will enable others skilled in the art to which it appertains to make and use the same.

The invention has relation to traps of the type embodying a spring actuated jaw and has for its object to prevent the premature closing of the jaw and the possible injuring of the hand.

In accordance with the present invention, a catch of peculiar formation is slidably mounted upon the base in such position as to engage the end of the jaw and hold the latter in open position during the setting of the trap and which catch may be readily disengaged from the jaw after the trap has been set and positioned without endangering or causing injury to the hand of the one manipulating the trap.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application,

Figure 1 is a top plan view of a trap embodying the invention, the full lines showing the trap set and the catch in engagement with the jaw, and the dotted lines showing the trap sprung and the catch disengaged from the jaw, Figure 2 is a detail side view showing the catch in engagement with the jaw, and Figure 3 is a similar view showing the catch disengaged from the jaw.

Corresponding and like parts are referred to in the following description and designated in the several views of the drawings by like reference characters.

The catch illustrated is of ordinary construction and comprises a base 1, trigger 2, spring actuated jaw 3 and jaw engaging bar 4.

The safety catch is slidably mounted upon an end of the base 1 so as to engage the end of the jaw 3 and obviate torsional strain thereon. The catch comprises a shank, a hook and a finger piece and is mounted to slide longitudinally of the base in keepers 5 which preferably consist of staples driven into the base. The shank comprises elements 6 and 7 disposed one above the other and sprung apart at their outer or free ends. The upper element 7 has a depression 8 at its outer end adjacent the hook 9 which coacts with the outer keeper 5 to prevent displacement of the catch when moved inward into engagement with the jaw. The element 6 projects and terminates in a finger piece 10 which is disposed beyond the end of the base 1 for convenience of operation. An enlargement 11 at the inner end of the catch constitutes a stop to limit the outward movement of the catch and prevent displacement thereof from the base. In the preferable construction, the catch is formed from a length of spring wire of suitable gage doubled upon itself and bent to provide the several parts, the folded end portions being brought together to form the elements 6 and 7, and the terminal portions being bent to provide the hook 9 and finger piece 10. The fold or bight is open to provide the enlargement 11 which constitutes the stop.

When setting the trap, the jaw 3 is moved into open position against the tension of the closing spring and is held in open or set position by sliding the catch inward to bring the hook 9 thereof into engagement with the outer end of the jaw. After the trap has been properly baited and the bar 4 engaged over the jaw and engaged by the trigger 2, the trap is placed in position and the catch moved outward so as to release the jaw to enable the same to be sprung in the usual way by pressure exerted upon the trigger 2.

What is claimed is:

1. A trap of the character specified comprising a base and a spring actuated jaw, a catch slidably mounted upon the base and comprising upper and lower elements normally sprung apart, the upper element having a depressed portion, and keepers on the base in cooperative relation with the catch to hold the same in place, one of said keepers adapted to engage the depressed portion of the upper element of the catch and prevent accidental movement thereof.

2. In a trap of the character specified comprising a base and a spring actuated jaw, a safety catch slidably mounted upon the base and comprising a length of spring wire doubled upon itself to provide upper and lower elements which are normally sprung apart, the upper element having a depressed portion, and a hook for engaging said jaw, and the lower element being extended and terminating in a finger piece, the fold of the wire being enlarged to provide a stop, and keepers applied to the base and having the catch slidably mounted therein.

In testimony whereof I affix my signature in presence of two witnesses.

JOHN J. REISIGER.

Witnesses:
 WALTER L. DECKER,
 CHESTER A. SIMPSON.